Figure 1:
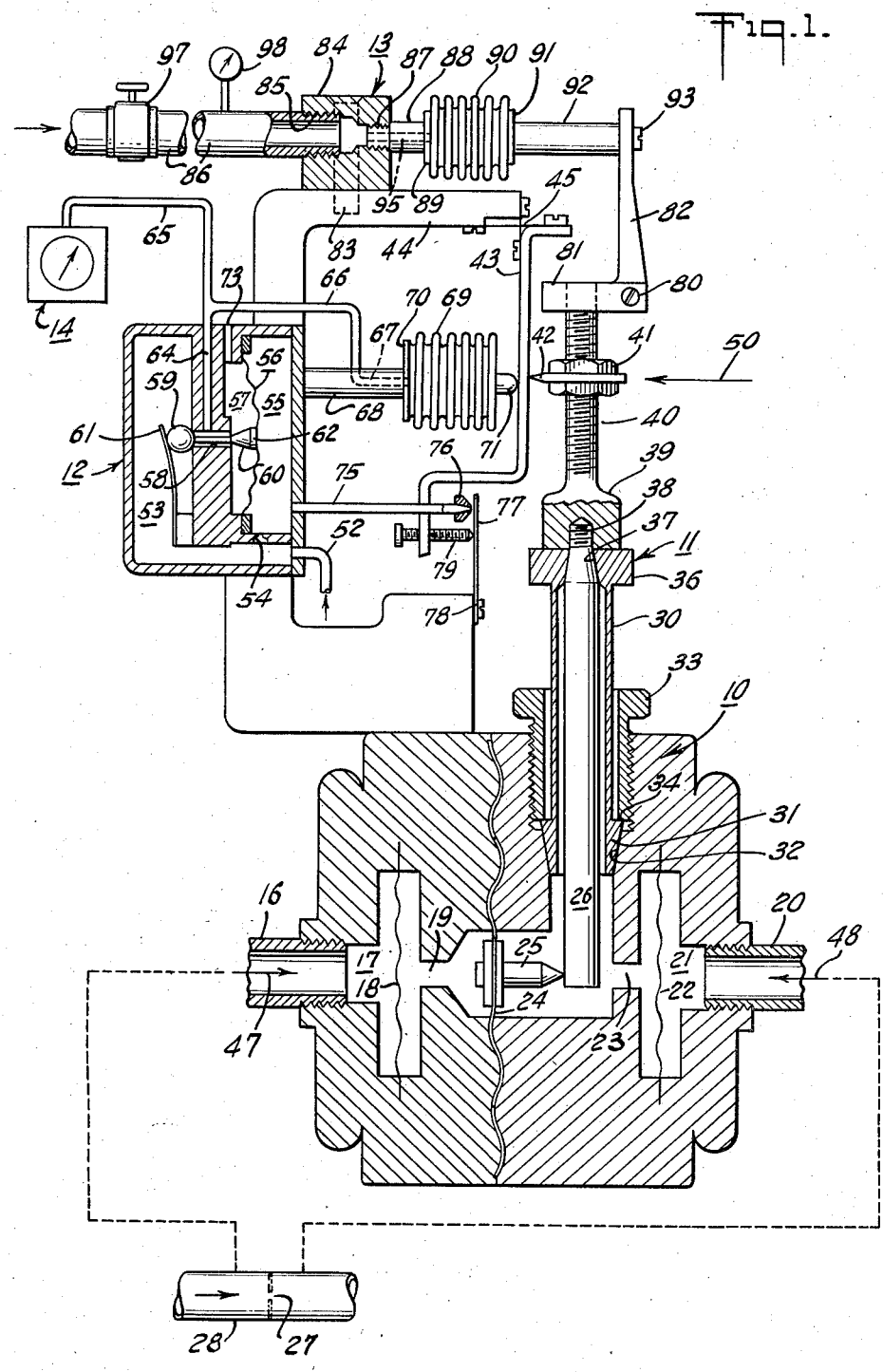

May 26, 1959

J. M. JONES 2,887,881

PRESSURE MEASURING APPARATUS

Filed March 9, 1956

2 Sheets-Sheet 1

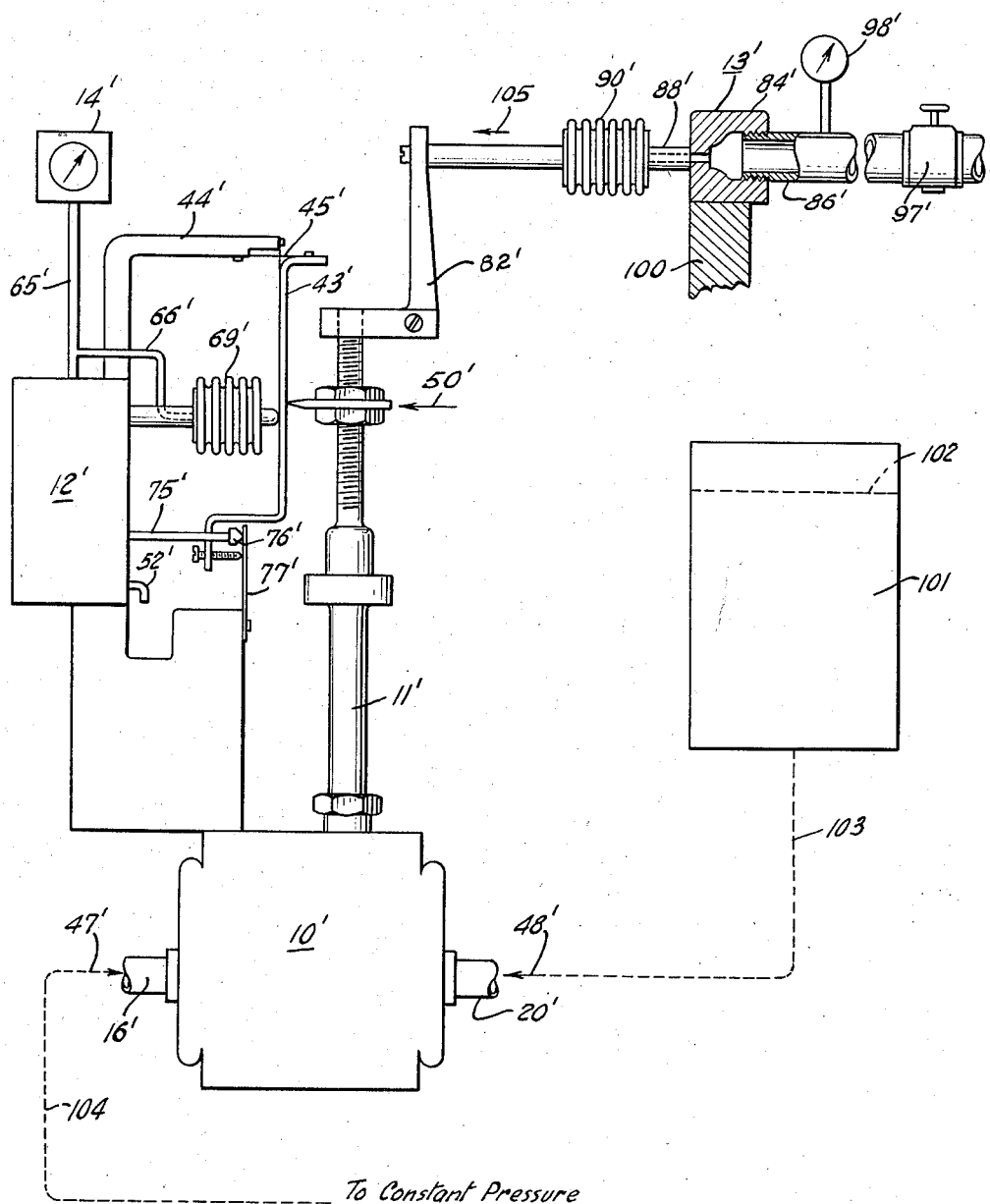

United States Patent Office 2,887,881
Patented May 26, 1959

2,887,881

PRESSURE MEASURING APPARATUS

James M. Jones, Port Arthur, Tex., assignor to The Texas Company, New York, N.Y., a corporation of Delaware Application March 9, 1956, Serial No. 570,624

5 Claims. (Cl. 73—388)

This invention relates to pressure measuring apparatus for indicating and recording the value of a variable process condition, such as pressure, differential pressure, fluid flow, liquid level and the like.

The apparatus of the present invention constitutes an improvement on the conventional pressure recorders which involve essentially a pressure differential assembly having an actuating member, such as a lever or a pivoted tube, which is movable in response to a change in pressure differential, together with a pneumatic relay of the force-balance type operatively associated with the actuating member so that movement of the latter converts a fluid pressure from a constant pressure source into a lesser value which bears a linear relationship to the measured pressure differential over a predetermined range of the latter, said converted pressure being communicated to and recorded by a conventional indicator.

Extremely sensitive and accurate devices of this type are available, which are calibrated for accuracy over a selected or predetermined range of pressure differential. The converted pressure from the pneumatic relay associated therewith is generally of a relatively low value, and the range of converted pressures is conveniently received and recorded by conventional miniature recording instruments which can accommodate only one range of output or converted pressures. When such a measuring device is employed within its calibrated pressure differential range, no difficulty is experienced. However, should the process condition change, resulting in the production of pressure differentials outside of the calibrated range, then it is necessary to substitute an entirely new pressure measuring apparatus which has been calibrated for the different range. As these precision instruments are quite expensive, this has involved the necessity of a substantial expenditure to maintain instruments available to cope with the variable process conditions. Moreover, this further necessitates the frequent dismantling of one unit in place at the plant controller and its replacement by another instrument, which runs the risk of altering or displacing the calibrated settings of these sensitive devices.

The present invention provides a solution to this problem in that it affords an accurate and sensitive calibrated pressure measuring apparatus which can be readily set for different ranges of pressure differential without altering the actual values of the converted pressures from the pneumatic relay, and consequently without requiring any change in the recording instrument connected thereto. This is accomplished without impairing the accuracy of the measuring apparatus with respect to its calibrated setting. The present invention furthermore enables conventional pressure measuring apparatus of the type involving a pressure differential assembly with movable actuating member and pneumatic relay associated therewith, to be readily converted to the new combination, whereby one apparatus in place on a plant unit can be easily reset to accommodate different ranges of pressure differential as the process condition may vary.

In accordance with the present invention, the pressure measuring apparatus involves, in combination, the usual pressure differential assembly with movable actuating member, the usual pneumatic relay of the force-balance type for converting the pressure differential to a predetermined pressure in the pneumatic relay which is recorded at the conventional indicator, and in addition a pneumatic means for imposing a constant force on the actuating member in one direction of its movement and throughout the normal range of its movement. In one embodiment, where the zero setting of the apparatus is for the lowest pressure of a variable process condition, the said pneumatic means opposes the normal movement of the actuating member resulting from an increase in pressure differential applied to the pressure differential assembly, said opposing force being such as to prevent normal movement of the actuating member from its zero position over an initial predetermined range of pressure differential, with further increase in pressure differential then overcoming said opposing force so that the actuating member moves through its normal range, and with said opposing force remaining constant through the range of movement of the actuating member.

In a second embodiment, where the zero setting of the apparatus is for the highest pressure of a variable process condition, the said pneumatic means applies a constant force on the actuating member in its direction of movement in response to an increase in pressure differential applied to the pressure differential assembly, the said applied force remaining constant throughout the normal range of movement of the said actuating member.

Preferred embodiments of the present invention are illustrated in the accompanying drawings, wherein:

Fig. 1 is a generally diagrammatic view partly in elevation and partly in vertical axial section of apparatus particularly adapted for measuring fluid flow in pipes or the viscosity of a liquid flowing through a capillary tubing; and Fig. 2 is a similar view of apparatus particularly adapted for recording liquid level in a tank.

Referring to Fig. 1 of the drawing, the pressure measuring apparatus comprises essentially a pressure differential assembly indicated generally at 10, an actuating member indicated generally at 11, a pneumatic relay indicated generally at 12, and pneumatic mechanism indicated generally at 13 for shifting both the zero point and the operative range of the apparatus with respect to measured pressure differential, without altering the actual values of the converted fluid pressures produced in the pneumatic relay 12 and recorded at the indicator 14.

The pressure differential assembly 10 can be of any suitable conventional type. The one illustrated more or less diagrammatically in the drawing is that shown and described in U.S. Patent No. 2,539,892 to L. Cook, dated January 30, 1951. This is part of a typical Foxboro instrument available on the market, and the constructional details are shown in the above-mentioned patent. This assembly comprises a high pressure fluid connection 16 communicating with chamber 17 separated by flexible diaphragm 18 from chamber 19; and a low pressure connection 20 communicating with chamber 21 separated by flexible diaphragm 22 from chamber 23. Chambers 19 and 23 are in turn separated by flexible diaphragm 24 to which is fastened the knife edge member 25 bearing against the lower end of rod 26 which forms part of the actuating member 11 as hereinafter more particularly described. The fluid connections 16 and 20 are respectively connected to the source of pressure differential to be measured, such as to opposite sides of an orifice 27 in a pipeline 28 containing a flowing liquid or gas. Chambers 19 and 23 represent a sealed system which is filled with liquid, so that the deflections of diaphragms 18 and 22 under the influence of the imposed pressure differential cause a corresponding movement through the hydraulic system of diaphragm 24 and knife edge 25, thereby moving the lower end of rod 26 to the right as the pressure differential is increased.

The actuating member 11 comprises a thin walled cantilever tube 30 rigidly mounted at the lower thickened end 31 thereof in the assembly 10, the portion 31 and the corresponding adjacent portion of the assembly 10 having cooperating inclined or conical surfaces 32. A threaded bushing 33 threaded into the casing of assembly 10 bears on a shoulder 34 of the thickened portion 31 to hold this part rigidly in place.

The upper portion of the thin walled cantilever tube 30 which extends loosely up through the larger bore of the threaded bushing 33 has a thicker wall portion 36 provided with an oppositely inclined bore 37 which receives a similarly inclined surface of rod 26 which is threaded at 38 into a threaded socket of an extension member 39, whereby the parts are rigidly held together. The upper portion of extension 39 is formed with a screw thread 40 on which is mounted the adjustable nut 41 having the knife edge 42 bearing against lever arm 43 which is pivoted to the rigid support 44 by the cross flexure 45. The construction is such that, upon increase in the pressure differential as represented by the force arrows 47 and 48 in the connections 16 and 20 respectively, the diaphragm 24 and knife edge 25 moves the lower end of rod 26 to the right, thereby causing a flexure in the thin walled cantilever tube 30 above its rigidly mounted support 31 which produces a swinging movement of the upper portion of the tube 30 and extension 39 rigidly connected thereto to the left, applying through the knife edge 42 a force indicated by the arrow 50 which swings lever arm 43 clockwise about the flexure pivot 45.

This movement of the actuating member 11 is operatively associated with the pneumatic relay 12 so as to produce a corresponding fluid pressure which is recorded at the indicator 14 that bears a linear relationship to the measured pressure differential over a predetermined range for which the instrument is calibrated. Any suitable conventional type of pneumatic relay of the force-balance type can be employed, such as the pressure convertor shown in the above-mentioned Cook Patent No. 2,539,892. However, the pneumatic relay illustrated in the drawing, which is also of the well-known Foxboro type, is generally similar to that illustrated in U.S. Patent No. 2,658,392 to W. E. Vannah, dated November 10, 1953.

This pneumatic relay 12 comprises a connection 52 from a source of fluid under constant pressure which communicates freely with a chamber 53 and through a restricted orifice 54 with a second chamber 55. The latter is separated by flexible diaphragm 56 from a chamber 57 which is arranged to communicate with the chamber 53 through passage 58 as controlled by the interconnected double valve 59—60. Valve 59 is urged toward closing position by flexible spring 61, while the interconnected valve 60 is fastened at 62 to the diaphragm 56.

Passage 58 communicates by output passage 64 and pipe 65 with the indicator 14, which is a conventional recorder adapted to register on a suitable chart the converted fluid pressure communicated thereto. Pipe 65 also communicates by branch pipe 66 and passage 67 in the rigid supporting arm 68 with the interior of bellows 69 having a fixed end 70 attached to the supporting arm 68 and a movable end 71 which bears against lever arm 43 in a direction to oppose the cantilever action of actuating member 11. Chamber 57 is provided with a small bleed passage 73 which opens to atmosphere. Chamber 55 is provided with a pipe connection 75 which terminates in a bleed nozzle 76 controlled by a flapper valve 77 pivoted on the frame at 78 and adjustable by the regulating screw 79 carried by the lower depending end of the lever arm 43.

The parts are shown substantially in their zero position at which the flapper valve 77 is held away from the tip of bleed nozzle 76 so that the pressure fluid in chamber 55 communicated through orifice 54 is bled off, allowing diaphragm 56 to move to the right with spring 61 closing valve 59. A zero reading is thus communicated to the indicator through passage 64 by reason of the bleed to atmosphere through passage 73. Upon imposition of a sufficient pressure differential to move actuating member 11 to the left, this will swing lever arm 43 clockwise and allow flapper valve 77 to approach and restrict bleed nozzle 76. This builds up a pressure in chamber 55 which moves the double valve 59—60 to the left, thereby partially opening valve 59 and allowing pressure to build up in passage 58 and chamber 57 which is communicated by pipe 65 to indicator 14. At the same time, this pressure is communicated by pipe 66 to bellows 69 which opposes the clockwise movement of the lever arm, and results in a force-balance being obtained for the resulting pressure differential then acting on the instrument. The converted fluid pressure thus produced in pipe 65 and communicated to indicator 14 results in a reading which is proportional to the said pressure differential.

Instruments of this type are calibrated to operate over a predetermined range of pressure differential, and to convert that pressure differential to a pressure in the pneumatic relay 12 which is less than the constant fluid pressure source 52 and which bears a linear relationship to the pressure differential over a predetermined portion of the pressure differential range. The range of converted pressures is sufficiently small so that conveniently a miniature recorder 14 of conventional type can be employed. For example, utilizing a source 52 of constant pressure fluid of say 25 pounds per square inch, the pneumatic relay 12 may be designed to supply a fluid pressure to the indicator 14 which varies from approximately 3 to 15 pounds per square inch for the range of pressure differential which the assembly 10 is calibrated to accurately measure. Should the process condition on the plant unit change, such that a different range of pressure differential is involved which may fall at least partially outside of the range for which the instrument has been calibrated, then it has been necessary with the conventional instruments on the market to substitute a completely new measuring device including a different pressure differential assembly 10 and its associated pneumatic relay 12 and indicator 14 to accommodate the different pressure differential range.

The present invention obviates that difficulty and provides, in a single instrument, a pressure measuring apparatus which is capable of ready adjustment to accommodate different pressure differential ranges, and which at the same time avoids alteration in the actual values of the converted pressures communicated to the indicator 14. In this manner, the instrument can employ the conventional miniature recorder 14 for the different pressure differential ranges, and there is no necessity for replacing any of the parts of the measuring instrument.

This is accomplished by the pneumatic mechanism indicated generally at 13, which can be readily added to conventional measuring devices now on the market. As shown, the upper end of the threaded part 40 has rigidly fastened thereto by screw 80 an encircling bracket 81 carrying an upright extension arm 82 which extends above the rigid support 44. Mounted on top of the support 44 by screws 83 is a mounting post 84 containing a threaded socket 85 which receives pipe 86. The mounting post also rigidly receives in the bore 87 a plug extension 88 which forms a fixed mounting for the end 89 of a bellows 90. The movable end 91 of the bellows carries a rigid arm 92 which is fastened by screw 93 at right angles to the upright extension 82. The plug 88 and fixed end 89 of bellows 90 are provided with a drilled bore 95 which communicates pressure fluid from pipe 86 to the interior of bellows 90.

Pipe 86 is connected to a second source of constant fluid pressure through the reducing valve 97, whereby a predetermined pressure as indicated by pressure gauge 98 can be supplied to bellows 90. The predetermined pressure to be supplied to the bellows 90 will of course depend on the effective lever arm of the connection of the movable end 91 of the bellows to the actuating member 11, which is in a direction that directly opposes normal movement of the actuating member 11 in response to the imposition of a pressure differential at the assembly 10. Thus, the pressure in bellows 90 from the second and independent source of pressure supply acts on the upright extension 82 to oppose normal movement of actuating member 11 from its otherwise zero setting throughout a certain predetermined initial range of pressure differential communicated to the mechanism 10. Upon further increase in pressure differential, the opposing force of bellows 90 is overcome, and the actuating member 11 then moves through its normal range of swinging movement as the pressure differential is further increased.

The fluid volume in the second fluid pressure source 86, as indicated in the drawing by the break in the showing of the pipe connection, is sufficiently great in relation to the contraction of bellows 90 throughout the normal range of movement of actuating member 11 that the force exerted by bellows 90 opposing swinging movement of actuating member 11 remains substantially constant. In this manner, not only is the zero point of the measuring apparatus shifted upwardly, but also the effective pressure differential range of the instrument is likewise shifted upwardly without altering the actual values of the converted pressures recorded at indicator 14 for the new pressure differential range. The instrument can be conveniently provided with a conversion chart or scale which converts the fluid pressure shown at gauge 98 into the pressure differential range as recorded at indicator 14.

The pressure differential measuring apparatus of Fig. 1 of the present invention can be used in connection with the automatic and continuously recording viscosimeter shown in applicant's copending application Serial No. 376,949, filed August 27, 1953, now Patent 2,791,902, issued May 14, 1957. Thus, upon material change in the viscosity of the stream being measured on the plant unit, thereby resulting in the production of pressure differentials which are outside of the calibrated range of the conventional instrument, this is readily taken care of by the present invention which enables a quick change in both the zero setting and the operative calibrated range of pressure differential by proper adjustment of the reducing valve 97 to provide a predetermined pressure in bellows 90 as indicated by gauge 98.

The present invention is also useful in many other applications where pressure or pressure differential measurement is involved, such as recording the liquid level in a tank and where liquids of differing gravities may be confined from time to time.

Fig. 2 discloses a preferred embodiment of the present invention which is particularly adapted for use as a liquid level indicator. The pressure differential assembly is indicated at 10', the actuating member at 11', the pneumatic convertor at 12' which is connected to the first source of constant fluid pressure 52', and the pressure indicator at 14'. Similar parts are indicated on Fig. 2 by primed reference numerals corresponding to the respective parts shown on Fig. 1.

In this case, a rigid support 100 is mounted at the opposite side of the actuating member 11' with its upstanding extension 82'. This support carries the mounting post 84' having the threaded socket receiving pipe 86' which is connected through reducing valve 97' to a second source of constant fluid pressure. This constant pressure is communicated to the interior of bellows 90' having the fixed end 89' and the movable end 91', the latter being operatively interconnected with the extension arm 82' by rigid arm 92'. The pressure as recorded at gauge 98' thus provides a force indicated at 105 acting on the extension 82 and actuating member 11' in the same direction of movement of the actuating member as produced by an increase in pressure differential at the assembly 10'.

As shown, the pipe 16' is connected by line 104 to a constant fluid pressure source. The pipe 20' is connected by line 103 to the bottom of tank 101 so as to be responsive to the head of liquid maintained in the tank, the level of which is indicated at 102.

In operation, the pressure in bellows 90' producing force 105 is regulated by valve 97' so that the sum of the moment of force 105 acting on extension arm 82' and the moment of force 47' acting on the opposite end of the actuating member 11' is balanced by the moment of the force 48' produced by the head of liquid maintained in tank 101 when the liquid level 102 is at its maximum height. This means that the maximum pressure indicated by force 48' will then be communicated through line 103 to the pipe 20' of the pressure differential assembly 10'. This provides the zero setting of the apparatus. Upon a drop in liquid level in tank 101, the pressure 48' accordingly drops, thus resulting in an increase in pressure differential communicated to the assembly 10'; and the combined moments of the forces 47' and 105 then overcome the moment of the force 48' and produce a swinging movement of the actuating member 11' in the direction of the arrow 50' as regulated by the pneumatic relay 12' of the force-balance type. The resulting pressure recorded at indicator 14' is thus an indication of the liquid level 102 in tank 101, the recorded pressure rising as the liquid level in tank 101 falls.

When a liquid of materially different gravity is supplied to tank 101, which of course gives different heads and forces 48' for equivalent liquid levels as compared to the previous liquid for which the mechanism was calibrated and used, the valve 97 is adjusted to alter the pressure in bellows 90' so that the force 105 plus the force 47' again gives a zero position of the actuating member 11' for the maximum liquid level in tank 101. The apparatus then indicates fluctuating liquid levels of the new liquid in tank 101 over the calibrated operative range of movement of the actuating member 11' without affecting the actual values of the pressure readings recorded at indicator 14' as transmitted thereto by the pneumatic relay 12'. A chart can be provided correlating liquid gravity with the pressure to be supplied to bellows 90' as shown at gauge 98' and converting pressure readings into liquid level readings. Here again, the pressure in bellows 90' and the force 105 remains constant over the entire normal range of movement of the actuating member 11'.

While the present invention has been described and illustrated simply as a means for indicating and recording a process variable, it is of course obvious that the disclosed apparatus can be employed with conventional actuating mechanism to automatically control fluid flow, liquid level, etc.

Obviously many modifications and variations of the invention, as hereinbefore set forth, may be made without departing from the spirit and scope thereof, and therefore only such limitations should be imposed as are indicated in the appended claims.

I claim:

1. In a pressure measuring apparatus, having a diaphragm chamber containing a diaphragm movable in response to fluid pressure difference on opposite sides thereof, an actuating member operatively connected with and movable by said diaphragm in response to change in said pressure difference, a pneumatic relay of the force-balance type having a source of constant fluid pressure and fluid bleed nozzle, a valve movable by said actuating member for regulating the fluid bleed from said nozzle to thereby convert said pressure difference into a fluid pressure in said pneumatic relay which is less than the pressure of said constant fluid pressure source and which bears a substantially linear relationship to said pressure difference over a predetermined range of pressure difference acting on said diaphragm, and an indicator responsive to said converted fluid pressure in said pneumatic relay, the improvement which comprises a second source of constant fluid pressure, a bellows having its interior connected to said second source of constant fluid pressure and having a fixed end and a movable end, said bellows having its movable end operatively connected to said actuating member in a manner to produce an opposing force thereon to prevent normal movement of said actuating member from its zero position in response to the imposition of an initial pressure difference on said diaphragm which produces a force on said actuating member which is less than said opposing force, the fluid volume in said second mentioned constant fluid pressure source and said bellows connected therewith being sufficiently large in relation to the contraction of said bellows as the movable end of the latter is moved by said actuating member over its operative range that the fluid pressure in said bellows remains substantially constant at the pressure of said second fluid pressure source, whereby both the said zero point and the operative range of the said apparatus for differential pressure measurement are shifted upwardly a predetermined amount without altering the actual values of the converted fluid pressures received by said indicator; and means for changing the value of said constant pressure of said second mentioned fluid pressure source within said bellows.

2. A pressure measuring apparatus comprising, in combination, a pressure differential responsive assembly having an actuating member movable in response to change in said pressure differential, a first source of constant fluid pressure, a pneumatic relay of the force-balance type connected to said first source of constant fluid pressure and operatively associated with said actuating member such that movement of said actuating member converts said pressure differential into a pressure in said pneumatic relay which is less than the pressure of said first constant fluid pressure source and which bears a linear relationship to said pressure differential over a predetermined range of the latter, an indicator responsive to said converted fluid pressure, a second source of constant fluid pressure, a bellows having its interior connected to said second source of constant fluid pressure and having a fixed end and a movable end, said bellows having its movable end operatively connected to said actuating member in a manner to prevent normal movement of said actuating member from its zero position in response to the imposition of an initial predetermined range of pressure differential, with further increase in said pressure differential then overcoming the opposing force of said bellows and causing contraction of the latter as said actuating member moves through its operative range, the fluid volume in said second mentioned constant fluid pressure source and said bellows connected therewith being sufficiently large in relation to the contraction of said bellows throughout said operative range that the fluid pressure in said bellows remains substantially constant at the pressure of said second fluid pressure source, whereby both the said zero point and the operative range of the said apparatus are shifted upwardly by a predetermined amount of pressure differential without altering the actual values of the converted fluid pressures received by said indicator; and a reducing valve in the connection from said second constant fluid pressure source to said bellows for changing the value of the constant pressure within said bellows.

3. A pressure measuring apparatus comprising, in combination, a pressure differential responsive assembly having an actuating member movable in response to change in said pressure differential, a first source of constant fluid pressure, a pneumatic relay of the force-balance type connected to said first source of constant fluid pressure and operatively associated with said actuating member such that movement of said actuating member converts said pressure differential into a pressure in said pneumatic relay which is less than the pressure of said first constant fluid pressure source and which bears a linear relationship to said pressure differential over a predetermined range of the latter, an indicator responsive to said converted fluid pressure, a second source of constant fluid pressure, and pneumatic means connected with said second source for imposing a constant force on said actuating member opposing the normal movement thereof resulting from an initial increase in said pressure difference and which prevents movement of said actuating member from its zero position over a predetermined initial range of pressure difference, said opposing force remaining constant throughout the range of movement of said actuating member resulting from further increase in said pressure difference; and means for changing the value of said constant opposing force.

4. In a pressure measuring apparatus having a diaphragm chamber containing a diaphragm movable in response to fluid pressure difference on opposite sides thereof, a cantilever tube having one end fixed in said chamber and its free end extending beyond said chamber, an operative interconnection between said diaphragm and said tube whereby an increase in said pressure difference applies a force tending to swing the free end of said tube in one direction about its mounting, a pneumatic relay of the force-balance type having a source of constant fluid pressure and a fluid bleed nozzle, a flapper valve for said nozzle, an operative interconnection between the free end of said tube and said flapper valve whereby swinging movement of said tube is effective to convert said pressure difference into a fluid pressure in said pneumatic relay which is less than the pressure of said constant fluid pressure source and which bears a substantially linear relationship to said pressure difference over a predetermined range of the latter, and an indicator responsive to said converted fluid pressure in said pneumatic relay, the improvement which comprises a rigidly connected extension on the free end of said tube, a bellows mounted at right angles to said extension having its outer end fixed and its movable end facing said extension operatively connected to said extension in a position to impose a force on said extension which is directly opposed to the swinging movement of said tube and extension under the influence of an increase in said pressure difference, a second source of constant fluid pressure, a fluid connection providing communication of said second source of constant fluid pressure with the interior of said bellows, said fluid pressure of said second source being of a value which prevents swinging movement of said tube and extension from its normal zero setting over a selected range of imposed pressure differential, with further increase in the imposed pressure differential then overcoming said opposing force and effecting swinging movement of said tube and extension with resultant contraction of said bellows, the fluid volume in said second fluid pressure source and bellows connected therewith being sufficiently large in relation to the contraction of said bellows throughout the operative range of swinging movement of said tube that the fluid pressure in said bellows remains substantially constant at the pressure of said second fluid pressure source, whereby both the zero point and the operative range of the said apparatus are shifted upwardly by a predetermined amount of pressure difference without altering the actual values of the converted fluid pressures received by said indicator; and a reducing valve in the connection from said second constant fluid pressure source to said bellows for changing the value of the constant pressure within said bellows.

5. A pressure measuring apparatus comprising, in combination, a pressure differential responsive assembly having an actuating member movable in response to change in said pressure differential, a first source of constant fluid pressure, a pneumatic relay of the force-balance type connected to said first source of constant fluid pressure and operatively associated with said actuating member such that movement of said actuating member converts said pressure differential into a pressure in said pneumatic relay which is less than the pressure of said first constant fluid pressure source and which bears a linear relationship to said pressure differential over a predetermined range of the latter, an indicator responsive to said converted fluid pressure, a second source of constant fluid pressure independent of the pressure transmitted by said pneumatic relay to said indicator, and pneumatic means including a bellows communicating with said second source of constant fluid pressure and operatively interconnected with said actuating member effective to impose a constant force on said actuating member in one direction of its movement, said force remaining substantially constant throughout the normal range of movement of said actuating member; and means for altering the value of the constant fluid pressure communicated to said bellows from said second source, whereby both the zero point and the operative range of the apparatus for differential pressure measurement are shifted a predetermined amount without altering the actual values of the converted fluid pressures received by said indicator.

References Cited in the file of this patent
UNITED STATES PATENTS

| | | |
|---|---|---|
| 2,408,685 | Rosenberger | Oct. 1, 1946 |
| 2,436,451 | Rosenberger | Feb. 24, 1948 |
| 2,441,044 | Tate | May 4, 1948 |
| 2,612,908 | Tate et al. | Oct. 7, 1952 |
| 2,638,921 | Caldwell et al. | May 19, 1953 |
| 2,658,392 | Vannah | Nov. 10, 1953 |
| 2,677,385 | Markson | May 4, 1954 |